(12) United States Patent
Bonn et al.

(10) Patent No.: US 6,441,344 B1
(45) Date of Patent: Aug. 27, 2002

(54) HEATABLE STEERING WHEEL, AND RIM AND METHOD THEREOF

(75) Inventors: Helmut Bonn, Haibach; Egon Schlett, Aschaffenburg, both of (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/943,421

(22) Filed: Aug. 31, 2001

Related U.S. Application Data

(63) Continuation of application No. PCT/DE00/00672, filed on Feb. 28, 2000.

(51) Int. Cl.[7] ............................................. B60L 1/02
(52) U.S. Cl. ............................................. 219/204; 219/202
(58) Field of Search .................................. 219/204, 202, 219/203, 206, 207, 208, 209, 212, 528, 529, 543, 544, 545, 549, 519

(56) References Cited

U.S. PATENT DOCUMENTS

| | | | |
|---|---|---|---|
| 5,605,643 A | * | 2/1997 | Reece .......................... 219/204 |
| 6,093,908 A | * | 7/2000 | Haag ........................... 219/204 |
| 6,172,342 B1 | * | 1/2001 | Khafagy et al. ............. 219/202 |
| 6,239,409 B1 | * | 5/2001 | Bonn et al. .................. 219/202 |
| 6,268,588 B1 | * | 7/2001 | Hazebrouck et al. ....... 219/204 |
| 6,279,419 B1 | * | 8/2001 | Testa et al. ................... 74/552 |
| 6,282,982 B1 | * | 9/2001 | Testa ............................ 74/552 |
| 6,326,593 B1 | * | 12/2001 | Bonn et al. .................. 219/204 |

FOREIGN PATENT DOCUMENTS

| | | | |
|---|---|---|---|
| DE | 297 12 839 U1 | | 10/1997 |
| DE | 100 27 046 A 1 | * | 6/2001 |
| EP | 0 831 117 A1 | | 3/1998 |
| JP | 58-183348 | | 10/1983 |
| JP | 2000225952 | * | 8/2000 |
| WO | WO 00/29271 | * | 5/2000 |

* cited by examiner

*Primary Examiner*—Teresa Walberg
*Assistant Examiner*—Vinod D. Patel
(74) *Attorney, Agent, or Firm*—Foley & Lardner

(57) ABSTRACT

A steering wheel includes a rim having a structural core, an outer casing, and a heating device for heating the outer casing. The core includes a frame and an insulating layer formed around the frame. The heating device includes a layer of electrically conductive plastic surrounding the core, and a pair of electrodes extending along the length of the conductive layer. The electrodes extend substantially along the entire peripheral length of the conductive layer, and the conductive layer encapsulates the insulating layer and the electrodes. The conductive layer heats the outer casing, which can be a decorative layer comprised of one or more of wood, leather, film, and lacquer, when current flows through the electrodes. The electrodes are positioned along the conductive layer to allow current to uniformly pass along the periphery of the steering wheel rim into the conductive layer.

28 Claims, 3 Drawing Sheets

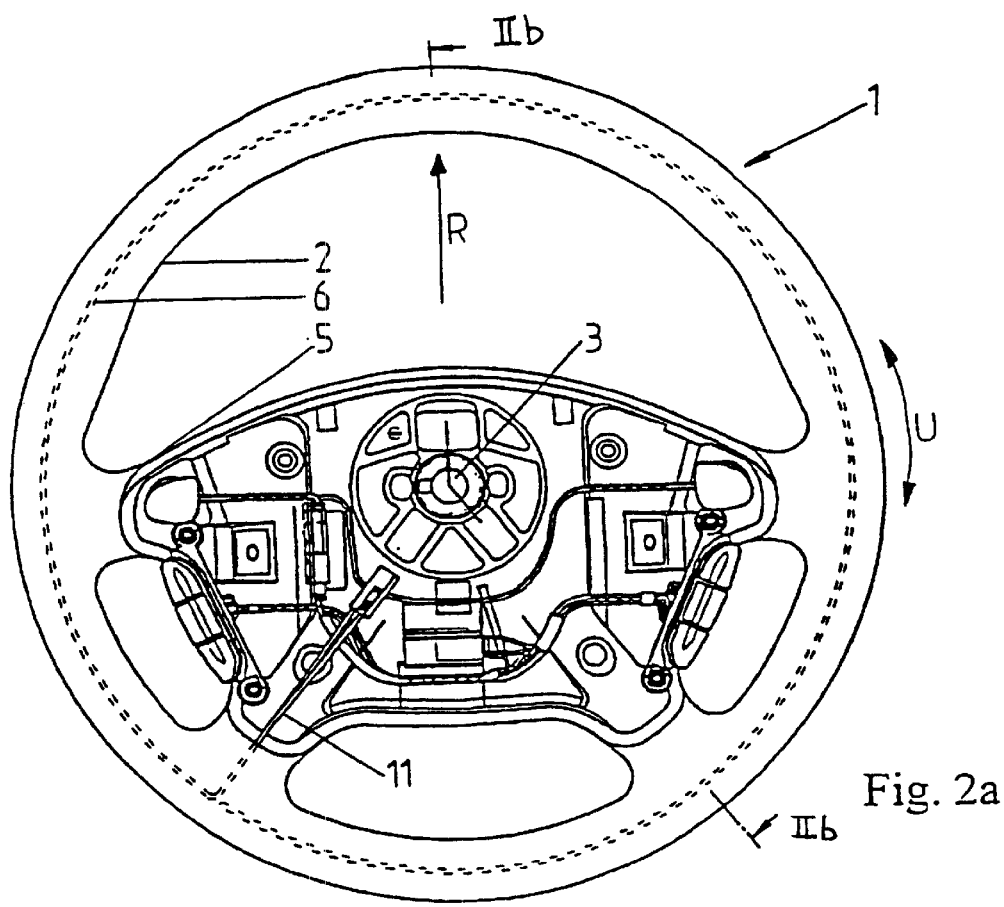
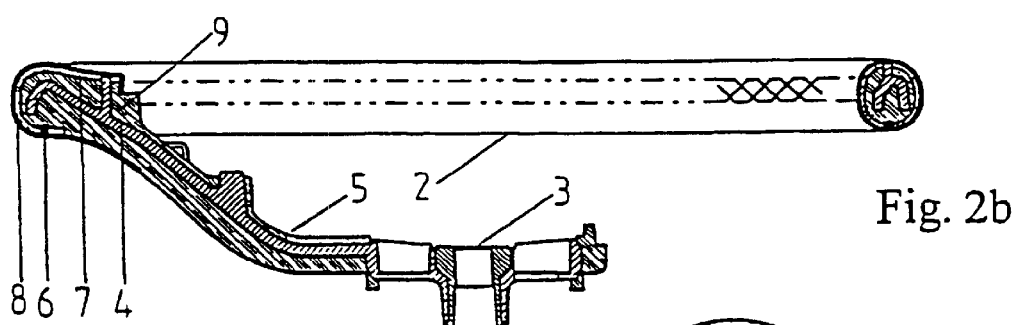
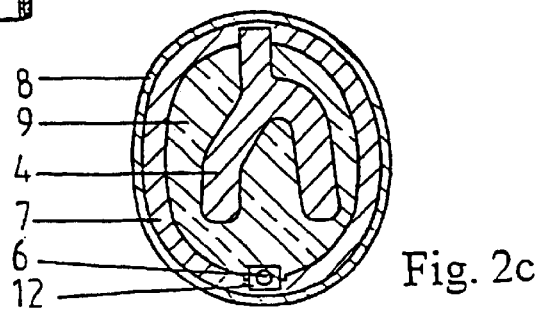
Fig. 2a
Fig. 2b
Fig. 2c

HEATABLE STEERING WHEEL, AND RIM AND METHOD THEREOF

This is a continuation of International Application PCT/DE00/00672 having an international filing date of Feb. 28, 2000. This international application was not published in English, but in German, as WO 00/51872.

BACKGROUND

To make driving more comfortable in winter or in cold climate, vehicles can include a heatable steering wheel, in addition to an air heater and a seat heater. Typically, the steering wheel rim includes a resistance heating element comprised of a heating wire. A heatable steering wheel is normally offered in luxury vehicles, which have a plush matching interior, typically include matching wood and leather. These materials, however, are not particularly suitable for transmitting heat because wood and leather are poor heat conductors. Indeed, a wooden steering wheel rim is generally thick, making it unsuitable for heating.

In this respect, German patent publication DE 297 12 839 discloses simplifying the production of a heatable steering wheel by injection molding conductive plastic shells onto its steering wheel rim. The conductive plastic acts as a resistance heating element. Wood and leather are used to dress the rim of a luxury vehicle. Accordingly, this reference still does not solve the non-uniform heating problem associated with these materials. Similar heating problems relating to uniformity and heating speed occur with a steering wheel rim encased with film or lacquer.

Accordingly, there is a need for a heatable steering wheel that can heat poor conductive materials used for covering the steering wheel rim. The present invention addresses this need.

SUMMARY

The present invention relates to a heatable steering wheel, a heatable steering wheel rim thereof, and a method of heating a steering wheel.

One aspect of the invention is a steering wheel rim, which can comprise a steering wheel rim core, an outer casing, and a heating device for heating the outer casing. The other aspect of the invention is a steering wheel that can include the above-described steering wheel rim. The steering wheel can include a steering wheel hub and spokes that connect the steering wheel rim to the hub. The heating device also can heat portions of the spokes.

The core can include a frame, which can be circular, and an insulating layer formed around the frame. The insulating layer can completely or substantially encapsulate or surround the frame. The heating device can include a layer of electrically conductive plastic surrounding the core, or resistance plates formed over the core, and a pair of electrodes extending along the length of the conductive layer or the resistance plate. More specifically, the electrodes can extend substantially along the entire peripheral length of the conductive or insulating layer, and the conductive layer can encapsulate the insulating layer and the electrodes. The rim can include an outer casing surrounding the conductive layer. The conductive layer heats the outer casing, which can be a decorative layer comprised of one or more of wood, leather, film, and lacquer, when current flows through the electrodes.

The electrodes are positioned along the conductive layer to allow current to uniformly pass along the periphery of the steering wheel rim into the conductive layer. The conductive layer can be configured as a plastic shell that at least partially fits around the core. The conductive layer also can completely surround the core. The conductive layer can be comprised of two half shells connected together over the core. The two half shells can be joined together by ultrasonic or electromagnetic welding. At least one of the half shells can include a securing projection for fastening to the core or the insulating layer. The conductive layer also can be comprised of at least two segments, which can be separately heated or only one of which is heatable. The conductive layer can be injection molded over the core to encapsulate the electrodes and the core.

The electrodes can be strip conductors extending along the periphery of the core. The electrodes can be spaced from each other in the radial direction or transversely thereof relative to the steering wheel rim. The electrodes can be substantially spaced apart diametrically opposite the core. A portion of the steering wheel frame can comprise one of the electrodes. Moreover, at least one of the electrodes can be comprised of copper strands or a perforated or profiled metal strip.

Another aspect of the present invention is the method of heating a steering wheel rim having a structural core. The method can include the steps of placing the pair of electrodes substantially diametrically opposite the core, surrounding the electrodes and the core with an electrically conductive plastic layer, and flowing current through the electrodes to distribute current to the electrically conductive plastic layer and heat the same. The electrodes extend along the length of the conductive layer. The method can include or more features of the steering wheel described above.

BRIEF DESCRIPTION OF THE DRAWINGS

FIG. 1b illustrates a cross-sectional view taken along line Ib—Ib of FIG. 1a.

FIG. 2a illustrates a plan view of another embodiment of a heatable steering wheel, with its central cover removed.

FIG. 2b illustrates a cross-sectional view taken along line IIb—IIb of FIG. 2a.

FIG. 2c illustrates an enlarged cross-sectional view of FIG. 2b, illustrating the details of the steering wheel rim of FIG. 2b.

FIG. 3b illustrates a cross-sectional view taken along line IIIb—IIIb of FIG. 3a.

DETAILED DESCRIPTION

Figure 1A:
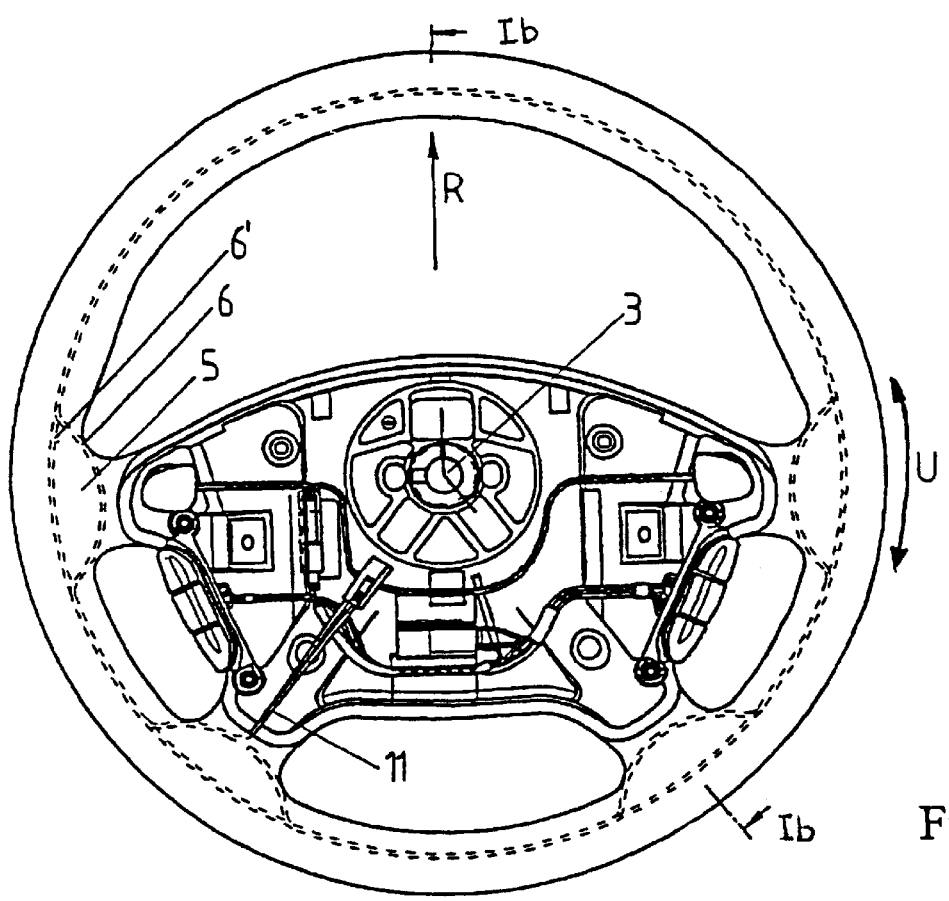
FIG. 1a illustrates a plan view of a heatable steering wheel, with its central cover removed.

For clarity, the present drawings omit those components not essential for illustrating the present invention, such as the center cover located over the steering wheel hub 3.

In all illustrated embodiments, the steering wheel 1 comprises a steering wheel hub or base 3, a steering wheel rim 2, and spokes 5 that connect the steering wheel rim 2 to the hub 3, and a rim heating device. The rim 2 comprises a circular steering wheel core. The core, which is structural for supporting a load, can include a frame 4 and an inner layer 9 encasing or enclosing the frame 4 as illustrated in the drawings, or can be formed of a monolithic material or a composite material. The frame 4 or the core itself can be connected to the spoke 5. The rim 2 further includes layers of materials that surround the core, such as an outer casing or cover 8, which can be leather, wood, or other visually appealing material. The frame or the core can be made of any conventional structural material, such as metal, plastic, graphite, carbon fiber, etc., of any configuration that provides the necessary strength.

Figure 1B:
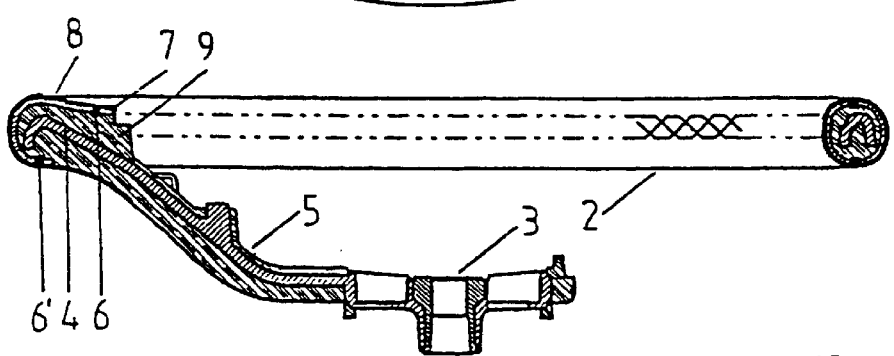
Figure 1C:
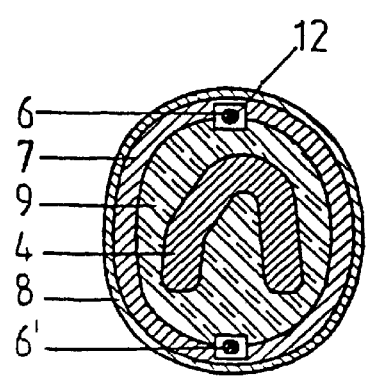
FIG. 1c illustrates an enlarged cross-sectional view of FIG. 1b, illustrating the details of the steering wheel rim of FIG. 1b.

FIGS. 1a–1c illustrate a first embodiment of a steering wheel 1 according to the present invention. Specifically, referring to FIG. 1c, the steering wheel frame 4 is situated at the center of the rim 2 as a supporting element and is connected to the hub 3 via the spokes 5. In this embodiment, the inner layer 9 completely surrounds or encases the frame 4, which has a substantially inverted U-shape. The inner layer 9 can be plastic, such as polyurethane or PUR, which have insulating properties. The rim 2 further includes an intermediate layer or shell 7, which can be plastic for example, completely surrounding or encasing the inner layer 9. The outer casing or cover 8, such as leather, surrounds the intermediate layer 7.

According to this embodiment, the rim heating device comprises a pair of electrical conductors 6, 6' of opposite polarity and the intermediate layer 7, which can be electrically conductive plastic surrounding the conductors 6, 6'. The conductors 6, 6' can be strip conductors. The conductors 6, 6' can be positioned diametrically opposite to each other over the inner layer 9. FIG. 1c illustrates these conductors 6, 6' positioned at twelve (top) and six (bottom) o'clock and sandwiched between the inner layer 9 and the intermediate layer 7. The electrically conductive shell or intermediate layer 7 is thus electrically connected to the conductors 6, 6', which extend circumferentially or peripherally U around the rim 2, as illustrated in FIG. 1a. The conductors or conductor strips 6, 6' can be formed of one or more metal strands encased in a conductive sheath 12, which can be made of conductive plastic. This sheath 12 is designed to stabilize the metal strands, which can be made of copper.

The conductive plastic shell 7 can be formed to have a suitable resistance by mixing plastic with conductive material or particles. For example, polymers filled with carbon fibers, carbon black or metal particles, for example HOSTAFORM X326 (POM with carbon fibers) from HOECHST are available for this purpose. The resistance can be controlled at least with the quantity of the conductive material used.

As the conductors 6, 6' extend over the entire circumference or periphery U of the rim 2, current can flow through the shell 7 over its entire length, which like the conductors 6, 6' extends along the periphery U of the steering rim 2, from one conductor 6 to the other conductor 6'. Because the conductors 6, 6' extends the entire length of the shell 7, the shell 7 can uniformly generate heat to uniformly heat the outer cover 8. The conductors 6, 6' can be connected to a power source via supply lines 11. FIG. 1a illustrates a supply line 11 for the upper electrode 6. A supply line 11 for the lower electrode 6' can be arranged on the lower side of the steering wheel rim 2, opposite the upper electrode supply line 11.

Based on the present configuration, the cover 8 can be uniformly heated using only a single current connection, via the supply lines 11, since the current is uniformly distributed around the periphery U of the shell 7 as the diametrically opposite conductors 6, 6' extend along the entire length of the shell 7. In the first embodiment, the upper and lower conductors 6, 6' are spaced apart from each other substantially perpendicularly with respect to the radial direction R of the rim 2. The shell 7, which is the heating element, therefore can have a low resistance, and the heat output can be targeted by appropriate selection of the shell thickness and the distance between the conductors 6, 6'.

The steering wheel 1 according to this embodiment can be formed by molding or injecting molding the inner layer 9 around the frame 4. After this step, the conductors 6, 6' can be set, such as by gluing or adhering onto the inner layer 9. Then, the shell 7 can be formed by injection molding conductive plastic over the inner layer 9 and the conductors 6, 6' to completely encase or encapsulate them. This step also forms electrical contacts between the conductors 6, 6' and the shell 7. Finally, the casing 8 can cover shell.

FIGS. 2a–2c and FIGS. 3a–3c illustrate second and third embodiments of a steering wheel 1 according to the present invention. These embodiments include components that are identical or similar to the ones described with respect to the first embodiment (FIGS. 1a–1c), identified by the same reference numbers. The description of identical or similar components previously described is thus omitted.

In the second embodiment (FIGS. 2a–2c), the steering wheel frame 4 is comprised of a metallic material, which can be used as a second electrode, as can best been seen from FIGS. 2b and 2c. In this respect, the frame 4 has a portion that projects through the inner layer from one side of the steering wheel rim 2 and extends into the shell 7 so that can be in electrical contact with the shell 7 along its entire length. In the illustrated embodiment, the frame has a substantially inverted Y-shape. The vertical leg portion thereof forms one of the conductors 6, 6'. Otherwise, the steering rim can be formed in the same manner as described in the first embodiment.

Figure 3A:
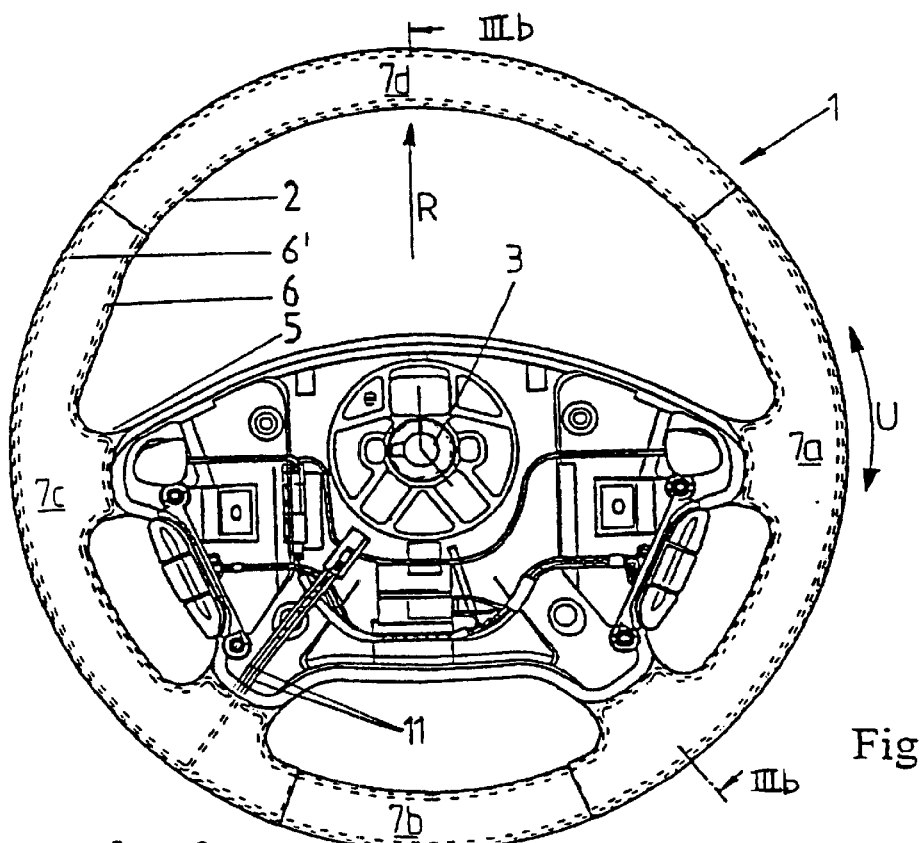
FIG. 3a illustrates a plan view of yet another embodiment of a heatable steering wheel, with its central cover removed.
Figure 3B:
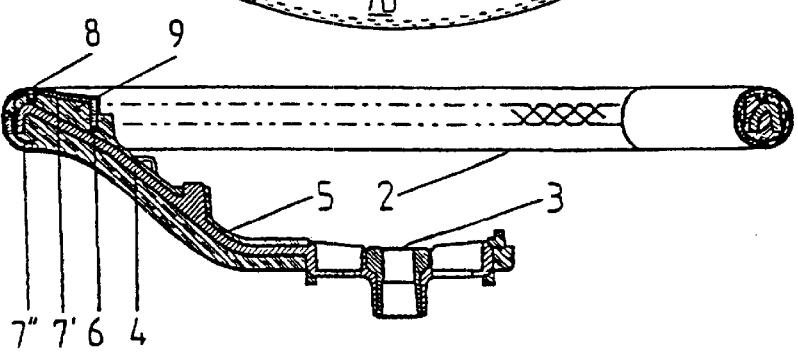
Figure 3C:
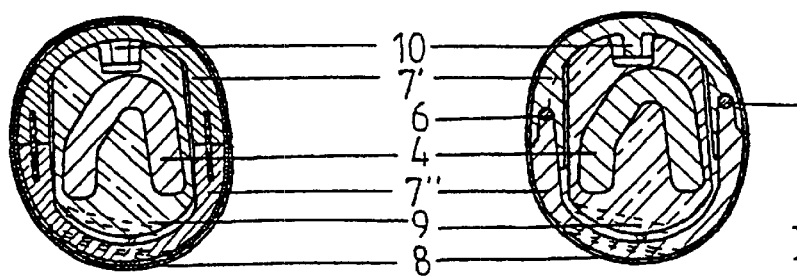
FIG. 3c illustrates an enlarged cross-sectional view of FIG. 3b, illustrating the details of the steering wheel rim of FIG. 3b.

FIGS. 3a–3c illustrate the third embodiment of a steering wheel according to the present invention. This embodiment differs in two respects from the first and second embodiments. First, in the third embodiment, the electrically conductive shell 7 is divided into four discrete segments 7a–7d. These segments can have different outer casings 8 and also can be independently heated. In the exemplary embodiment, only segments 7a, 7c, referred to respectively as a 3 o'clock position and a 9 o'clock position of the steering wheel, are heated. The other two segments 7b, 7d can have an insulating plastic instead of a conductive plastic. Secondly, each of the shell segments 7a, 7c comprises of two half shells 7', 7", as can be seen on the right-hand side of FIG. 3c. These half shells 7', 7" are connected in a play-free manner to the inner layer 9 via a securing projection 10 (for example, by means of latching elements). Furthermore, the two half shells 7', 7" can be connected to each other by electromagnetic welding or ultrasonic welding, in which case the two strip conductors 6, 6' can act as heating elements or direction indicators for the welding process.

FIG. 3c, on the left-hand side, illustrates the non-heatable shell segments 7b, 7d. Here, perforated metal strips can replace the conductors 6, 6' of the heatable shell segments 7a, 7c. The metal strips further improve the ability to hold the shell halves 7', 7" together.

In this third exemplary embodiment, the conductors 6, 6' run spaced apart from each other in the radial direction R of the steering wheel on the "right-hand side" and "left-hand side" of the steering wheel rim 2, substantially similar to the first embodiment, but located at left and right, as opposed to top and bottom.

In the third embodiment, the inner insulating layer 9 is formed around the steering wheel frame 4, such as by injection molding, as in the first and second embodiments. Thereafter, the half shells 7', 7" can be injection molded into corresponding shapes and the conductors 6, 6' are placed into complementary recesses formed in the half shells. The half shells 7', 7" then can be positioned around the inner layer 9 and, by means of ultrasound or an alternating magnetic field, the plastic in the region of the conductors 6, 6' can be melted to join or fuse the half shells 7, 7' together under pressure. This also creates contact between the conductors 6, 6' and the half shells 7', 7". The half shells 7', 7" can be secured to the inner layer 9 via a securing projection 10, which project into a recess or cavity formed in the inner layer 9. The casing 8 can be is applied over the shell 7.

Even when an integral, conductive shell 7 is used as in the first and second embodiments as a resistance heating element, heating of the individual regions of the steering wheel rim 2 can be controlled; for example, by insulating the conductors 6, 6' in the regions not requiring heating, so that no current conducts into the shell in those regions.

According to the present invention, the steering wheel can have at least one heating element formed by an electrically conductive plastic element. The heating element can extend along the periphery of the steering wheel rim. The steering wheel further includes two electrodes of different polarity. These electrodes extend along and electrically contact the heating element. The current can supply over the entire length to the heating element, which can extend along the entire steering wheel rim. Accordingly, the entire steering wheel rim or selected portions thereof can be uniformly heated.

The resistance of the heating element of the steering wheel according to the present invention can be reduced in comparison with a heating element described in German patent publication DE 297 12 839 since the current (in the present invention) flows around a predetermined portion of the conductive shell, namely circumferentially about a central longitudinal axis of the rim 2 rather than the entire shell, namely circumferentially about the central axis of the steering wheel. That is, in the present invention, the current need not conduct through the entire heating element from one end to the other (electrodes). In the present invention, the electrodes 6, 6' provide infinite current paths that can travel through the shell 7 about its central longitudinal axis so that they can provide current anywhere along the length of the rim.

As the shell can be made of conductive plastic, the heat output can be set in a targeted manner by variation of the thickness and conductivity of the shell and the distance between the electrodes. Since the shell is heated uniformly because of the corresponding supply of current along the periphery of the steering wheel, reliable heating of the steering wheel in a manner pleasant for the occupant is ensured even if a poor heat conductive material (i.e., decor) is used for the outer casing.

Since the plastic element can be produced in any desired shape in a very simple manner by injection molding, the outlay on the production of the heatable steering wheel is considerably reduced in comparison with steering wheels having a heating wire. Coiling heating wire around parts of the steering wheel rim is eliminated according to the present invention.

The plastic element can be injection molded directly onto the steering wheel rim core. The shell can comprise two half shells joined together or mechanically fastened to the core. The half shells can be connected to each other by ultrasonic welding or electromagnetic welding, in which case the electrodes extending along the shells act as energy-direction indicators or as a heating element. In this regard, the electrodes can be formed from a perforated or profiled metal strip to form an optimum interlocking connection as the liquefied plastic can fill any void and spaces that are present.

It is expedient for the shell or the half shells to have at least one securing point for their securing to the steering wheel frame or part of the rim profile. This results in a play-free connection between the shell or the half shells and the steering wheel frame and/or rim profile. For example, the steering wheel frame may be provided with recesses in which corresponding projections on the (half) shells engage.

The electrodes, which extend together with the plastic element along the periphery of the steering wheel rim, can be configured as strip conductors. This enables uniform heating to be achieved with a small overall resistance of the heating device (comprising the plastic element plus electrodes). The intention is for the strip conductors to be in contact with the plastic element at a predetermined, preferably constant spacing from one another. An arrangement of the electrodes on opposite sides of the plastic element designed as a shell (for example, spaced apart at the top and bottom or in the radical direction of the steering wheel rim) is particularly expedient. Instead of a second strip conductor, the steering wheel frame, which conventionally is comprised of, in any case, a conductive metal, can form the second electrode.

As an alternative, the use of resistance plates instead of the plastic elements would also be possible, but the production of the steering wheel is more complicated in this case and therefore use of resistance plates is preferable only in special cases.

The outer casing, which covers the shell, can be made, for example, from wood, leather, film, and/or lacquer. The casing forms the decorative surface this is visible. The present invention allows a greater selection of materials and permits a free design. Even if different materials are used, local overheating is eliminated since the heating takes place very uniformly by means of the longitudinally extending plastic element and the placement of the electrodes, which allows current flow along its direction of extent.

With the solution according to the invention it is, of course, also possible only to heat individual segments of the steering wheel rim. For this purpose, it is expedient to divide the plastic element along the periphery of the steering wheel rim into segments of which only individual ones are heated. For example, it is therefore possible to heat the steering wheel only in what is referred to as the 3 o'clock and the 9 o'clock position, i.e., the regions in which the driver usually grasps the steering wheel. Also, individual regions or segments of the heating element can be heated separately, for example to different degrees.

Furthermore, it is possible at the same time to at least partially heat the spokes, via which the steering wheel rim is connected to a steering wheel hub. This can be achieved by providing a conductive layer to those parts of the spokes to be heated and the associated electrodes. In this case, the electrically conductive plastic elements and also the electrodes can be formed integrally with the corresponding parts of the steering wheel rim.

The disclosures of the parent application, PCT/DE00/00672, and its priority application, DE 199 10 132.9, in their entirety, including the drawings, claims, and the specification thereof, are incorporated herein by reference.

We claim:

1. A heatable steering wheel comprising:
   a steering wheel rim comprising a steering wheel rim core, an outer casing, and a heating device for heating the outer casing,
   wherein the heating device comprises a layer of electrically conductive plastic surrounding the core and two electrodes extending along a length of the conductive layer, and
   wherein the outer casing surrounds the conductive layer.

2. A heatable steering wheel according to claim 1, wherein the electrodes are positioned along substantially the entire length of the conductive layer to allow current to uniformly pass along the periphery of the steering wheel rim into the conductive layer.

3. A heatable steering wheel according to claim 1, wherein the conductive layer is configured as a plastic shell that at least partially fits around the core.

4. A heatable steering wheel according to claim 3, wherein the conductive layer completely surrounds the steering wheel core.

5. A heatable steering wheel according to claim 1, wherein the conductive layer comprises two half shells connected together over the steering wheel core.

6. A heatable steering wheel according to claim 5, wherein the two half shells are joined together by ultrasonic or electromagnetic welding.

7. A heatable steering wheel according to claim 5, wherein at least one of the half shells include a securing projection for fastening to the core.

8. A heatable steering wheel according to claim 7, wherein the core comprise a steering wheel frame and an internal layer completely surrounding the frame.

9. A heatable steering wheel according to claim 1, wherein the conductive layer comprises at least two segments.

10. A heatable steering wheel according to claim 9, wherein the segments are separately heatable.

11. A heatable steering wheel according to claim 9, wherein one of the segments is heatable.

12. A heatable steering wheel according to claim 1, wherein the conductive layer is injection molded over the core.

13. A heatable steering wheel according to claim 12, wherein the injection molded conductive layer encapsulates the electrodes.

14. A heatable steering wheel according to claim 1, wherein the electrodes are strip conductors extending along the periphery of the core.

15. A heatable steering wheel according to claim 1, wherein the electrodes are spaced from each other in the radial direction or transversely thereof relative to the steering wheel rim.

16. A heatable steering wheel according to claim 1, wherein the electrodes are substantially spaced apart diametrically opposite the core.

17. A heatable steering wheel according to claim 1, wherein the core comprises a steering wheel frame and an internal layer substantially surrounding the frame.

18. A heatable steering wheel according to claim 17, wherein a portion of the steering wheel frame comprises one of the electrodes.

19. A heatable steering wheel according to claim 1, wherein at least one of the electrodes comprises copper strands.

20. A heatable steering wheel according to claim 1, wherein at least one of the electrodes comprises a perforated or profiled metal strip.

21. A heatable steering wheel according to claim 1, further including spokes and a steering wheel hub, the spokes connecting the steering wheel rim to the hub, wherein the heating device heats portions of the spokes.

22. A heatable steering wheel according to claim 1, wherein the outer casing is a decorative layer comprised of at least one of wood, leather, film, and lacquer.

23. A heatable steering wheel comprising:
    a steering wheel rim comprising a steering wheel rim core and an outer casing, and a heating device for heating the outer casing,
    wherein the heating device comprises resistance plates formed over the core and two electrodes extending along the plates, and
    wherein the outer casing surrounds the plates.

24. A heatable steering wheel rim comprising:
    a frame;
    an insulating layer formed around the frame;
    a pair of electrodes extending along a peripheral length of the insulating layer; and
    an electrically conductive layer encapsulating the insulating layer and the electrodes.

25. A heatable steering wheel rim according to claim 24, wherein the electrodes extend substantially along the entire length of the conductive layer.

26. A heatable steering wheel rim according to claim 24, further including an outer casing, the electrically conductive layer heating the outer casing when current flows through the electrodes.

27. A method of heating a steering wheel rim having a structural core, comprising the steps of:
    placing a pair of electrodes positioned substantially diametrically opposite the core;
    surrounding the electrodes and the core with an electrically conductive plastic layer, wherein the electrodes extend along the length of the conductive layer;
    flowing current through the electrodes to distribute current to and heat the electrically conductive plastic layer.

28. A method according to claim 27, wherein the electrodes are formed to extend substantially along the entire length of the conductive layer.

* * * * *